UNITED STATES PATENT OFFICE.

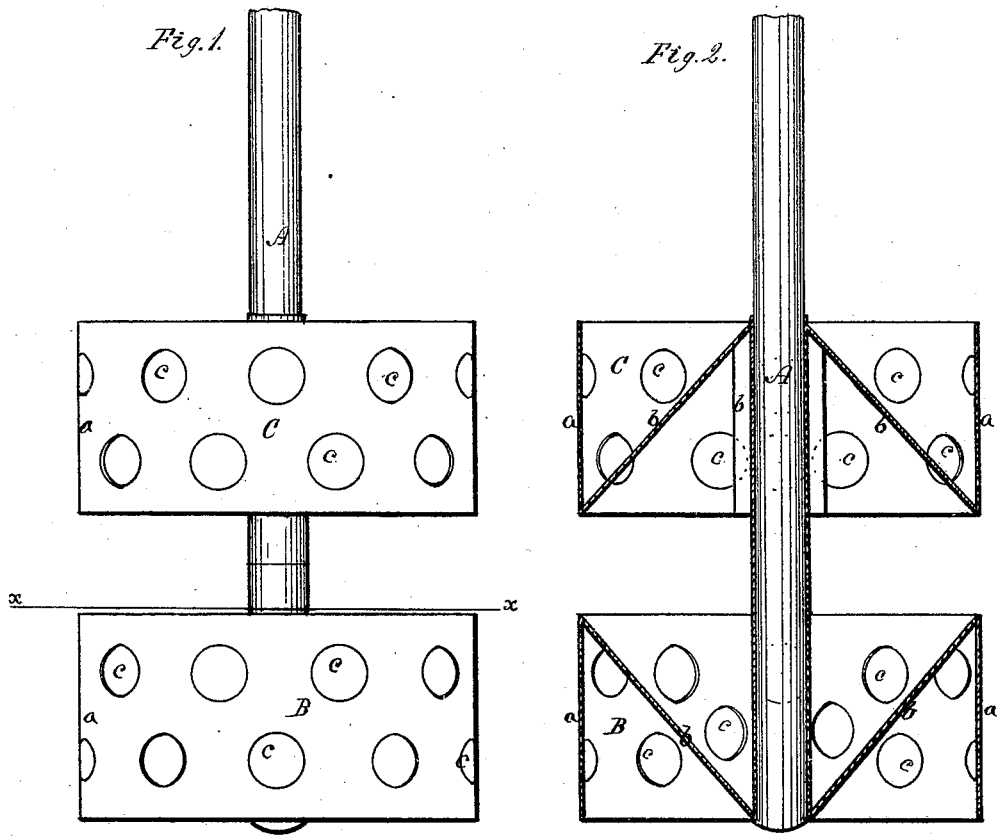
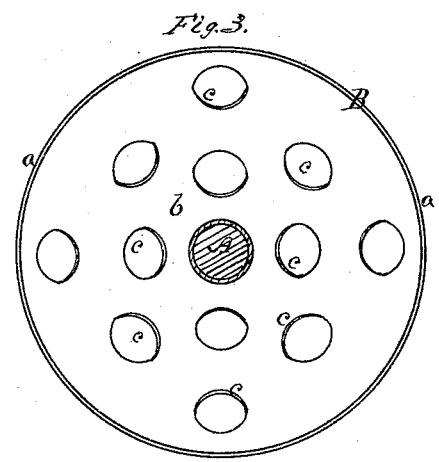

RANSOM A. VICK, OF HOLLY SPRINGS, MISSISSIPPI.

IMPROVEMENT IN CHURN-DASHERS.

Specification forming part of Letters Patent No. 130,395, dated August 13, 1872.

*To all whom it may concern:*

Be it known that I, RANSOM A. VICK, of Holly Springs, in the county of Marshall and State of Mississippi, have invented an Improved Churn-Dasher; and I do hereby declare that the following is a full and exact description thereof, reference being had to the accompanying drawing making part of this specification—

Figure 1 being a side view of the improved churn-dasher; Fig. 2, a central vertical section of the same; Fig. 3, a horizontal section, cutting in the line $x\ x$, Fig. 1.

Like letters designate corresponding parts in all the figures.

Let A represent the rod of an up-and-down reciprocating churn-dasher, to which this invention is applied. On the lower end thereof is a dasher, B, constructed in my improved manner. It consists of a cylindrical outer body, $a$, made of sheet-tin, or wood, or other suitable material, and perforated with numerous holes $c\ c$, as indicated in the drawing. Then from one open end of this cylinder or body, the upper end, as shown in the drawing, extends a cone, $b$, inward, till it reaches the dasher-rod A, which it surrounds, ending in a tube, or equivalent, for the purpose of attachment. This conical portion tapers, so as to give an angle of about forty-five degrees to its inclination, and the vertical height of the conical and cylindrical portions should be about the same. The cone also is perforated, as shown.

This dasher acts in a very effective manner to turn the cream first in one direction and then in the other, and to force it laterally through the perforations, so as to rapidly separate and bring the butter. It does not matter which end of the dasher goes up, since not only its reciprocating movement renders its action the same in either case, in each double reciprocation, but its real effect is very nearly the same in the up as in the down motion. Another dasher, C, of like construction to the dasher B, may be placed on the dasher-rod, above it, but its position is reversed in relation to the cone $b$. The two dashers may be placed as close to or as far from each other as desired; and one may be adjustable to and from the other, if desired. Additional dashers of like construction and arrangement might be used.

What I claim as my invention, and desire to secure by Letters Patent, is—

1. The combination of the perforated cone $b$ with the perforated cylinder $a$, substantially as and for the purpose herein specified.

2. The combination of the two dashers B C, constructed as described, and inverted toward each other, as and for the purpose herein specified.

RANSOM A. VICK.

Witnesses:
A. Q. WITHERS,
H. HERTH.